United States Patent [19]

Perkey

[11] 4,114,948
[45] Sep. 19, 1978

[54] AUTO HEADREST

[76] Inventor: R. V. Otis Perkey, 1310 SE. 30th Ave., Ocala, Fla. 32670

[21] Appl. No.: 821,582

[22] Filed: Aug. 3, 1977

[51] Int. Cl.² ............................................... A47C 1/10
[52] U.S. Cl. ...................................... 297/397; 297/391
[58] Field of Search ...................... 5/327 B, 337, 338; 297/391, 384, 397, 399, 410, DIG. 4

[56] References Cited

U.S. PATENT DOCUMENTS

| 3,226,159 | 12/1965 | Binding | 297/397 |
| 4,031,578 | 6/1977 | Sweeney et al. | 5/337 |

Primary Examiner—James C. Mitchell

Attorney, Agent, or Firm—Mason, Fenwick & Lawrence

[57] ABSTRACT

An auxiliary headrest for an automobile has a U-shaped cushion body of relatively soft foam material including a back cushion portion and spaced side cushion portions extending forwardly of the back cushion portion to define a space receiving the back of a user's head; a rearwardly extending support member is spaced from the medial horizontal plane of the cushion body and is positioned between the built-in headrest and the top of the back of an automobile seat for maintaining the auxiliary headrest forwardly of the built-in headrest. The height of the U-shaped cushion can be varied by inverting the headrest.

7 Claims, 6 Drawing Figures

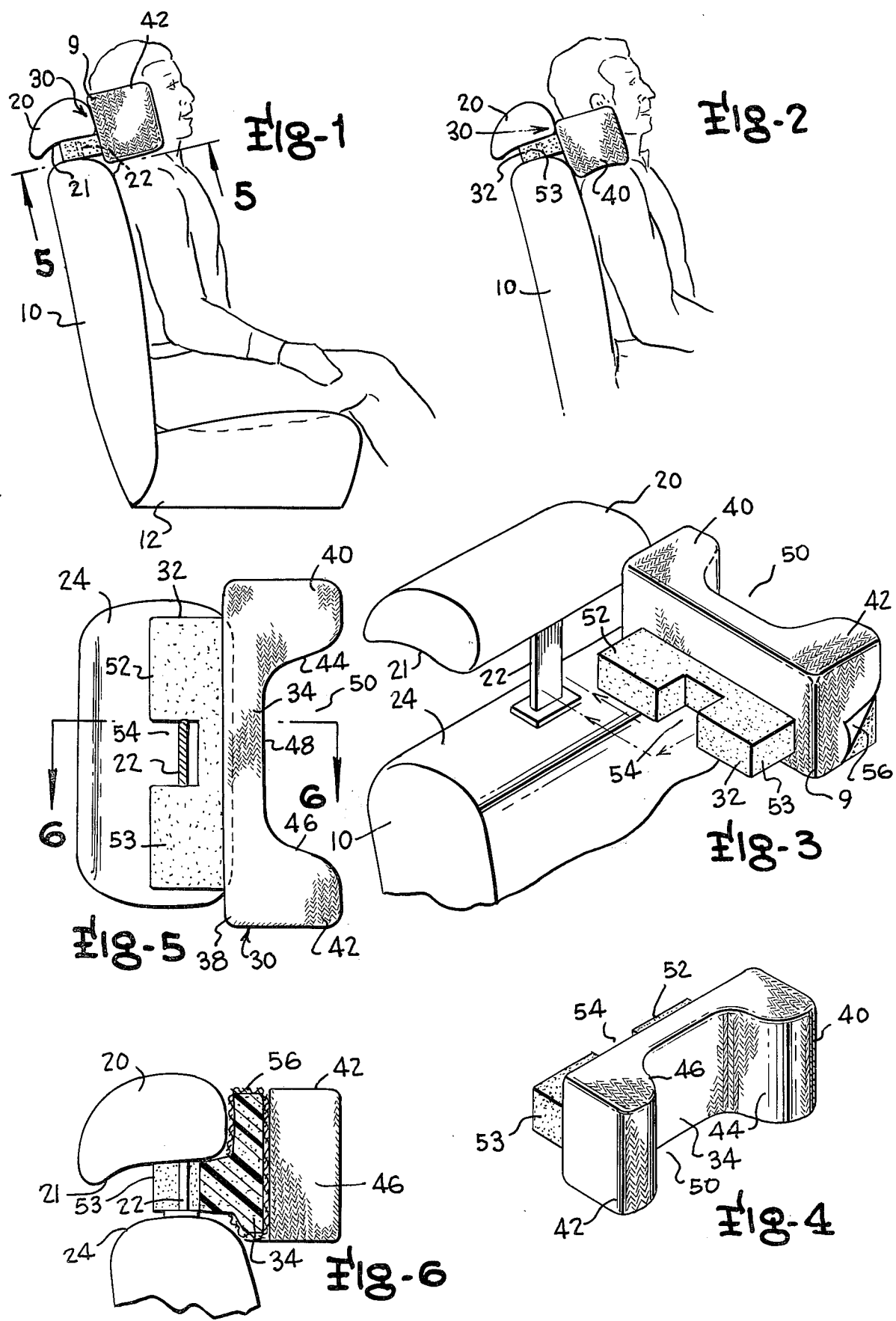

AUTO HEADREST

This invention is in the field of automobile accessories and is more specifically directed to a new and improved auxiliary headrest which can be associated with the built-in headrest provided at the upper portion of the back of many automobile seats. The well-known built-in headrest construction employed in the majority of automobiles represents a substantial improvement over the previously employed seat constructions not having a headrest component. However, the presently known automobile headrest devices suffer from a number of shortcomings due to a variety of factors. For example, many of the presently known headrest constructions are overly hard and rigid so as to be capable of inflicting a relatively substantial blow to a user's head in the event of a rear-end collision or similar accident in which the headrest forcefully engages the head of the user.

Another problem with the presently known headrest constructions is that they do not provide lateral stability for the head of the user; in other words, the presently known headrests do not resist sideways movement of the head of the user. Consequently, the head of the user may tend to move to the side from a position in front of the headrest if the user falls asleep or if the automobile makes a sudden turning or swerving movement.

Another problem with the previously known headrest constructions is that they are positioned several inches to the rear of the user's head during normal operation of the vehicle so that the user's head travels this several inches before striking the headrest in the event of a rear-end collision so as to present a substantial possibility of injury to the user. This possibility is compounded by the fact that most of the prior known headrests are formed of relatively hard and ungiving material.

Another problem with known headrest designs is that they do not have the proper vertical and horizontal orientation for engaging the head of a short person or child.

Therefore, it is the primary object of this invention to provide a new and improved automobile headrest.

A further object of this invention is the provision of a new and improved auxiliary automobile headrest which can be attached to a conventional automobile seat.

Yet another object of the invention is the provision of a new and improved automobile headrest providing a resistance to lateral movement of the user's head.

A further object of the invention is the provision of a new and improved automobile headrest normally in contact with the back of the user's head for cushioning and protecting the head in the event of an accident.

Achievement of the foregoing objects is enabled by the preferred embodiment of the invention through the provision of an auxiliary headrest comprising a U-shaped cushion body formed of relatively soft polyurethane material and including a rectangular back cushion portion extending substantially parallel with the back of the seat to which the device is attached. The cushion body further includes a pair of forwardly extending side cushion portions which extend forwardly of the ends of the back cushion portion and are spaced apart a sufficient distance to permit the head of a user to be positioned therebetween. Additionally, a rearwardly extending support member extends from the back cushion portion at a location spaced either above or below the medial horizontal plane of the back cushion portion. The support member is of U-shaped configuration and includes a slot which can fit about the vertically extending headrest support standard of a conventional automobile seat so that the built-in headrest can be lowered downwardly on the support member to retain the support member and the association cushion body in position on the upper end of the back portion of the automobile seat. The cushion body can be positioned in an upper position when the auxiliary headrest is positioned with the rearwardly extending support member above the medial horizontal plane prior to connection to the automobile seat. However, the auxiliary headrest can be positioned in a lower position by simply inverting it from the last-mentioned positions so that the rearwardly extending support member is positioned below the medial horizontal plane of the back cushion portion of the auxiliary headrest member.

The manner in which the foregoing objects are achieved by the preferred embodiment will become apparent when the following written description is considered in conjunction with the appended drawings in which:

FIG. 1 is a side elevation view illustrating the preferred embodiment of the invention as attached in an elevated or higher position to an automobile seat occupied by a user;

FIG. 2 is a side elevation view of the preferred embodiment as attached to the automobile seat in an alternative lower position from that of FIG. 1;

FIG. 3 is a perspective exploded view illustrating the manner of attachment of the preferred embodiment to the automobile seat;

FIG. 4 is a perspective view of the preferred embodiment;

FIG. 5 is a sectional view taken along lines 5—5 of FIG. 1; and

FIG. 6 is a sectional view taken along lines 6—6 of FIG. 5.

Attention is initially invited to FIG. 1 of the drawings which illustrates the preferred embodiment of the invention consisting of an auxiliary headrest 9 positioned in an upper position with respect to the back portion 10 of a conventional automobile seat 12. Seat 12 has a built-in headrest 20 having a lower surface 21 and supported on the upper end of a generally vertical standard 22 extending upwardly from the upper surface 24 of the back portion 10 with the auxiliary headrest being positioned between surface 21 and 24 as best illustrated in FIG. 3.

The auxiliary headrest member 9 is formed of two primary components consisting of a U-shaped cushion body 30 and a rearwardly extending support member 32. Both the U-shaped cusion body and the rearwardly extending support member 32 are unitarily formed of a body of soft cushioning materials such as foamed polurethane or the like.

The U-shaped cushion body 30 comprises a back cushion portion 34 having opposite ends 36 and 38 with first and second side cushion portions 40 and 42 respectively extending forwardly from the opposite side ends 36 and 38 of the back cushion portion 34. It will be appreciated that the side cushion portions 40 and 42 respectively include inclined inwardly facing surfaces 44 and 46 which cooperate with the front surface 48 of back cushion portion 34 to provide an area 50 in which the head of a user can be positioned.

Rearwardly extending support member 32 includes side portions 52 and 53 between which a slot 54 of sufficient width is formed to be positioned about the vertical standard 22 of the build-in headrest 20 as best illustrated in FIG. 5. It will be observed that the U-shaped cushion body 30 is provided with a cloth or the like cover 56 while the rearwardly extending support member 32 is normally uncovered. However, the rearwardly extending support member 32 could also be provided with a cover if desired.

An important feature of the preferred embodiment resides in the fact that the rearwardly extending support member 32 extends unitarily from a portion of the back cushion 34 spaced from and consequently either above or below the horizontal medial plane of the back cushion plate 34. Whether the support member is above or below the horizontal medial plane depends upon the orientation of the cushion body. In FIG. 1, the auxiliary headrest 9 is oriented so that the rearwardly extending support member 32 is below the medial plane of the U-shaped cushion body 30 with the side portions 52 and 53 being clamped between the lower survace 21 of the built-in headrest 20 and the upper end surface 24 of the back of the automobile seat back 10. The cushion body 30 is consequently in its elevated or higher position with respect to the seat back 10.

The auxiliary headrest member 9 can be positioned in either of the two positions illustrated in FIGS. 1 and 2. When the device is positioned as shown in FIG. 1, the rearwardly extending support member 32 is positioned below the medial horizontal plane of the U-shaped cushion body 30 so that the U-shaped cushion body 30 is in a relatively high position both with respect to the back 10 of the automobile seat and the head of the user.

Alternatively, the auxiliary headrest 9 can be positioned as shown in FIG. 2 in which the rearwardly extending support member 32 is positioned above the horizontal medial plane of the U-shaped cushion body 30 which is consequently in a relatively lower position both with respect to the back 10 of the seat and the head of the user. The selection of one or the other of the foregoing positions depends upon the height of the user and the individual comfort factor provided with each position. However, it should be appreciated that it is an extremely simple matter to reverse the auxiliary headrest 9 from either of the positions of FIGS. 1 and 2 in accordance with the needs of different users.

It should be understood that the invention is not limited to the preferred embodiment since numerous modifications will undoubtedly occur to those of skill in the art. Therefore, the spirit and scope of the invention is to be limited solely by the appended claims.

I claim:

1. An auxiliary headrest for an automobile seat of the type having a built-in headrest supported by a generally vertically extending standard extending upwardly from the top of the back of the automobile seat, said auxiliary headrest comprising a U-shaped cushion body of relatively soft material including a back cushion portion extending across the rear width of the cushion body and side cushion portions extending forwardly of the ends of the back cushion portion and spaced apart to permit the back of a user's head to be positioned therebetween and a rearwardly extending support member extending rearwardly of said back cushion portion to be positioned between the built-in headrest and the top of the back of the automobile seat for positioning and maintaining said auxiliary headrest forwardly of the built-in headrest, wherein said support member includes a slot dimensioned to snugly fit around said generally vertically extending standard and side portions on opposite sides of said slot and having an upper surface engaged with the lower end of said headrest and a lower surface resting on the upper end surface of the automobile seat.

2. The invention of claim 1 wherein said cushion body and said support member are formed of foam material.

3. The invention of claim 1 wherein said rearwardly extending support member is of less vertical height than said back cushion portion and extends rearwardly therefrom at a location vertically offset from the horizontal medial plane of the back cushion portion so that the cushion body can be supported in either a higher or lower position with respect to the back of the seat depending upon the orientation of the support member.

4. The invention of claim 1 wherein said support member is a rectangular plinth in form, said cushion body and said support member are formed of foam material and said rearwardly extending support member is of less vertical height than said back pillow portion and extends rearwardly therefrom at a location vertically offset from the horizontal medial plane of the back pillow portion so that the cushion body can be supported in either a higher or lower position with respect to the back of the seat depending upon the orientation of the support member.

5. The invention of claim 1 wherein said side cushion portions have inwardly facing canted surfaces engageable with the back portion and sides of the head of a user.

6. The invention of claim 5 wherein said support member is a rectangular plinth in form, said cushion body and said support member are formed of foam material and said rearwardly extending support member is of less vertical height than said back cushion portion and extends rearwardly therefrom at a location vertically offset from the horizontal medial plane of the back cushion portion so that the cushion body can be supported in either a higher or lower position with respect to the back of the seat depending upon the origination of the support member.

7. The invention of claim 6 wherein said cushion body and said support member are formed of polyurethane foam and additionally including cloth cover means covering said cushion body.

* * * * *